United States Patent
Wehrens et al.

[19]

[11] Patent Number: 6,099,790
[45] Date of Patent: Aug. 8, 2000

[54] METHOD OF MANUFACTURING HOLLOW BODIES AND BLOW MOLDING MACHINE FOR EFFECTING THE METHOD

[75] Inventors: Dirk Wehrens, St. Augustin; Rudolf Maier, Lohmar; Frank Schüller, Königsdorf; Willi Döhmen, Möchengladbach, all of Germany

[73] Assignee: Fischer-W. Müller Blasformtechnik GmbH, Troisdorf, Germany

[21] Appl. No.: 09/189,651

[22] Filed: Nov. 10, 1998

[30] Foreign Application Priority Data

Nov. 11, 1997 [DE] Germany ............................ 197 49 626

[51] Int. Cl.[7] ............................ B29C 49/04; B29C 49/32
[52] U.S. Cl. ...................... 264/542; 425/532; 425/534; 425/538; 425/541
[58] Field of Search ................................. 425/538, 532, 425/534, 541; 264/542, 540

[56] References Cited

U.S. PATENT DOCUMENTS

| | | | |
|---|---|---|---|
| 3,003,187 | 10/1961 | Schaich .................................... | 264/542 |
| 3,849,049 | 11/1974 | Brieschke et al. ....................... | 425/532 |
| 4,459,095 | 7/1984 | Rohr et al. .............................. | 425/532 |
| 4,552,526 | 11/1985 | Hafele ..................................... | 425/534 |
| 5,478,229 | 12/1995 | Kato et al. .............................. | 425/532 |
| 5,501,591 | 3/1996 | Effenberger ............................. | 425/534 |
| 5,562,934 | 10/1996 | Langos et al. .......................... | 425/541 |
| 5,576,034 | 11/1996 | Kiefer et al. ............................ | 425/538 |

FOREIGN PATENT DOCUMENTS

| | | | | |
|---|---|---|---|---|
| 44-16235 | 7/1969 | Japan | ..................... | 425/538 |
| 49-38101 | 7/1969 | Japan | ..................... | 425/532 |

*Primary Examiner*—Robert Davis
*Attorney, Agent, or Firm*—Brown & Wood, LLP

[57] ABSTRACT

A method of manufacturing hollow bodies including inserting into spaced mold halves of a blow mold of a blow molding machine plastic hose-shaped blanks at an extrusion station of the blow molding machine and closing the blow mold, displacing the closed blow mold from the extrusion station to a calibration station of the blow molding machine, inserting thereat blow mandrels into respective cavities of the closed blow mold, lifting, after expiration of predetermined blow time, the blow mandrels, together with the blown hollow bodies to an intermediate position and removing the blown hollow bodies from the blow mandrels lifting the blow mandrels to their initial position thereof, and displacing the blow mold from the calibration station to the extrusion station, with the displacing of the blow mold between the extrusion station and the calibration station being effected by displacing the blow mold at a right angle to a connection line of arranged side-by-side cavities of the blow mold.

5 Claims, 1 Drawing Sheet

METHOD OF MANUFACTURING HOLLOW BODIES AND BLOW MOLDING MACHINE FOR EFFECTING THE METHOD

BACKGROUND OF THE INVENTION

1. Field of the Invention

The present invention relates to a method of manufacturing hollow bodies in a multi-cavity blow molding machine having an extrusion station, a calibration station spaced from the extrusion station and located parallel thereto, and a blow mold, with the method including inserting, into spaced mold halves of the blow mold, plastic hose-shaped blanks at the extrusion station and closing the blow mold, displacing the closed blow mold from the extrusion station to the calibration station, inserting, at the calibration station, blow mandrels into respective cavities of the closed blow mold, lifting, after expiration of a predetermined blow time, the blow mandrels, together with the blown hollow bodies to an intermediate position and removing the blown hollow bodies from the blow mandrels, thereafter, lifting the blow mandrels to their initial position, and displacing the blow mold from the calibration station back to the extrusion station.

The present invention also relates to a blow molding machine for effecting the method.

2. Description of the Prior Art

The above-described multi-cavity or long-stroke blow molding machines are disclosed, e.g., in European Patent No. 0 570 393 B1and prospect "Long-Stroke Blow Molding Machines" of the firm "Fischer-W. Müller Blasformetchnik Gmbh", January 1996, an assignee herein. In these blow molding machines, the extrusion and the blow (calibration) stations are arranged along a vertical elongate central plane under each other on a line along which the blow mold reciprocates. The time of a cycle of a blow-molding machine depends not only on the blow time but also, to a great extent, on the down time associated with the displacement of the blow mold and closing and opening of the mold halves. The linear displacement stroke in these blow molding machines increases with each additional cavity in the blow mold. This is because the length of the blow mold, together with the closing system, in the direction of the connection line, should exceed the width of the blow mold, which results in a proportional increase of the displacement stroke with additional cavities, resulting in increase of the displacement time. With short blow or cooling down time, which amounts to about 5 sec. for a typical surface of a hollow body produced with these blow molding machines, the displacement time can be of the same order as the blow and cooling down time when the blow mold has more than four cavities. With the blow mold having more than four cavities, the displacement path can reach, e.g., 1600 mm, with the process speed being also influenced by a high weight of the closing system, which can amount to several ton. E.g., the weight of the closing system can be above 6 ton. Such a large mass cannot be displaced from one position into another sufficiently rapidly, without using a very powerful drive and associated with it excessive costs. It may happen that down time is greater than the blow and cooling down time, which adversely affects the economical use of a long-stroke blow molding machine, as with the increase of the down time, the output of a blow molding machine decreases.

Accordingly, an object of the present invention is to provide a method of and a multi-cavity blow molding machine for manufacturing hollow bodies with which the cycle time and, in particular the time associated with the displacement of the mold between the extrusion and calibration stations is reduced to a minimum.

SUMMARY OF THE INVENTION

This and other objects of the present invention, which will become apparent hereinafter, are achieved, according to the present invention, by displacing the blow mold between the extrusion and blow or calibration stations at a right angle to the connection line of the arranged side-by-side cavities. With the displacement of the blow mold transverse to the connection line, which connects the arranged side-by-side cavities, the displacement stroke becomes independent from the number of cavities in the blow mold. Therefore, the number of cavities can be increased, without affecting the displacement stroke and, thus, without any increase in time necessary for effecting the displacement stroke. The displacement time becomes only dependent from the distance between the extrusion and blow or calibration stations.

The present invention permits to substantially reduce the down time to an extent that it becomes substantially smaller than the blow and cooling down time necessary for manufacturing of the hollow bodies. Thereby, a significantly greater number of cycles can be obtained in a unit of time.

Further, the displacement of the blow mold according to the present invention permits to reduce the distance between the extrusion and the blow of calibration stations, permitting to thereby reduce the overall dimensions of the blow molding machine. The present invention also permits to reduce the costs of the hydraulic drive of the long-stroke blow molding machine as the distance covered by the blow mold is substantially reduced.

In the long-stroke blow molding machine according to the present invention, the blow mold is mounted on the machine frame. The displacement stroke in the blow molding machine of the present invention can be reduced, e.g., from 1600 mm to 200 mm. With the long-stroke blow molding machines according to the present invention, the necessary additional operations, such as coining and aftercooling of the blown hollow bodies can be effected in stations which are arranged parallel to the extrusion and blow stations closely adjacent to the blow station, so that a small displacement stroke would be required for the displacement of the finished product. Besides, only small masses need be displaced.

According to an advantageous embodiment of the present invention, the blow mold, together with the closing or blocking unit, are mounted on a stand supported on the machine frame and displaceable with appropriate electrical or hydraulic drive means.

According to the preferred embodiment of the present invention, a vertically displaceable hose section feeder is provided at the extrusion station. The blow mold is displaceable between the extrusion and blow stations in the lifted position of the feeder, without the fed hose section extending into the displacement path and impeding the displacement movement. Advantageously, the feeder is provided with appropriate cutting, welding and preblow means. Alternatively, the hose section can be fed without using a feeder. In this case, the feeding is not continuous.

BRIEF DESCRIPTION OF THE DRAWINGS

The features and objects of the present invention will become more apparent, and the invention itself will be best understood from the following detailed description of the preferred embodiment when read with reference to the accompanying drawings, wherein:

FIG. 1 shows a schematic plan view of a multi-cavity blow molding machine according to the present invention including a blow mold displaceable between an extrusion station and a calibration station arranged parallel to the extrusion station.

DETAILED DESCRIPTION OF THE PREFERRED EMBODIMENT

Figure 1:
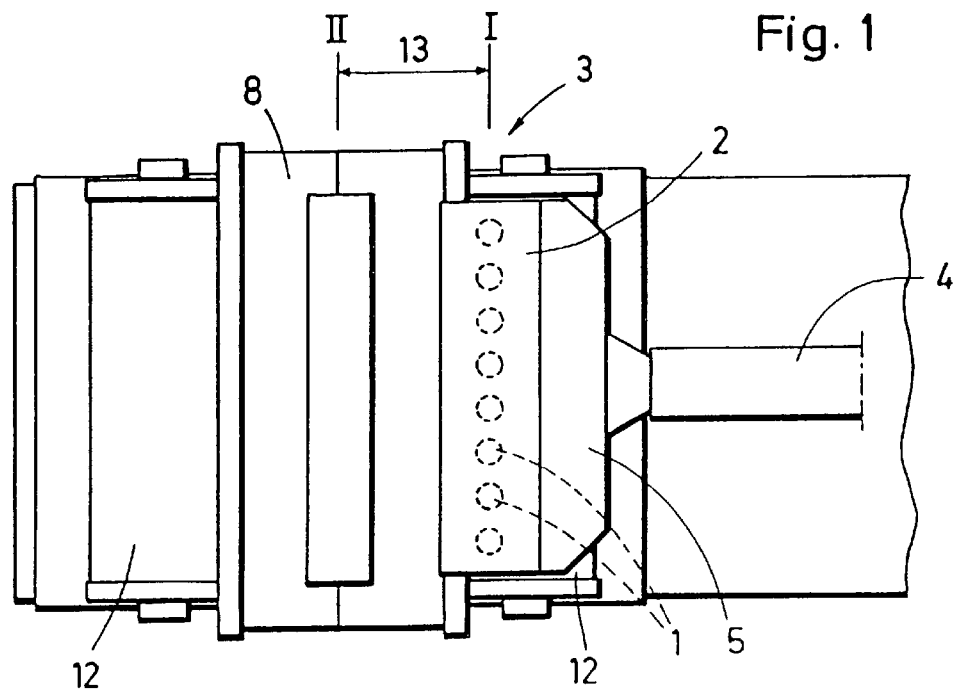
Figure 2:
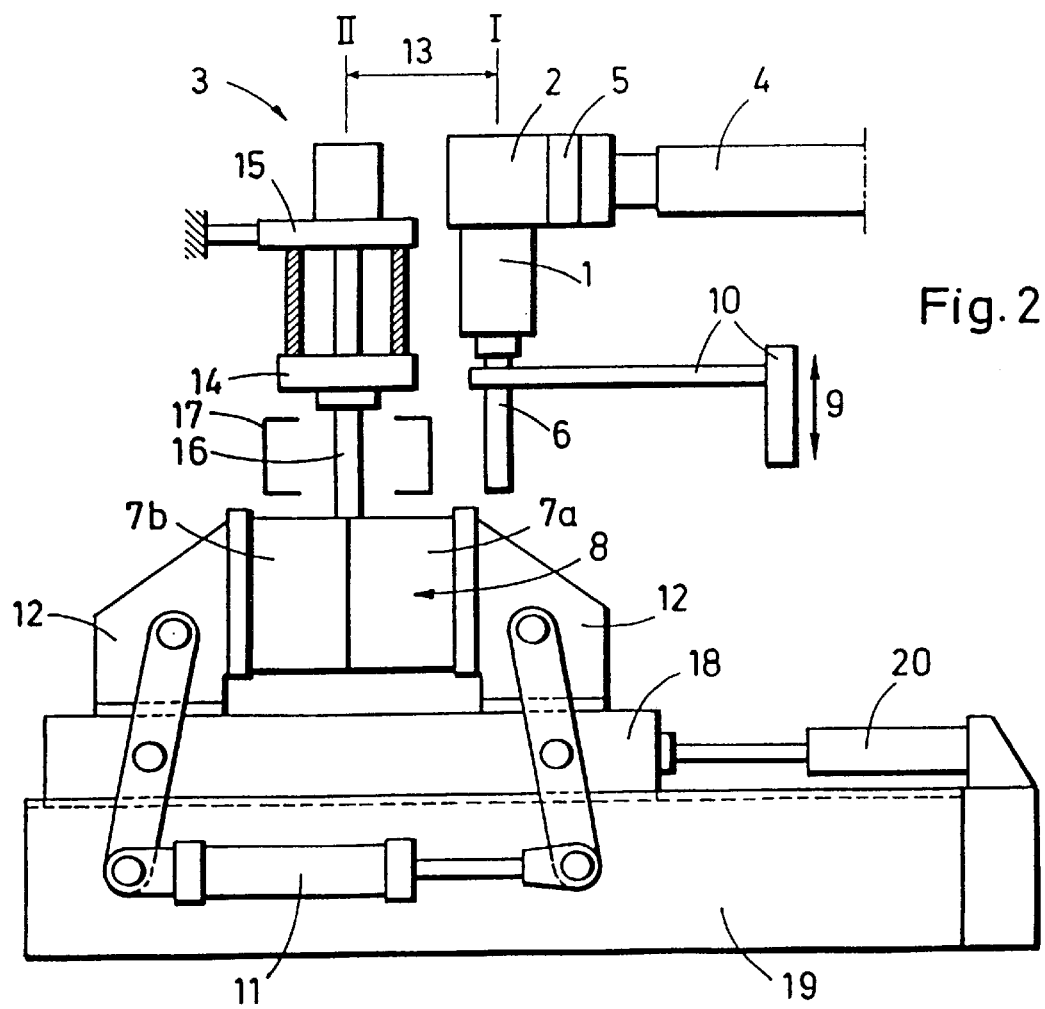
FIG. 2 Shows a side view of the blow molding machine shown in FIG. 1

A multi-cavity blow molding machine 3 according to the present invention and shown in the drawings includes a multi-head station 2 including a row of spaced from each other head strands 1. The blow molding machine 3 further includes an extruder 4 and a runner 5, which is located downstream of the extruder 4, for feeding to the multi-head station 2 plastic material necessary for manufacturing of blown hollow bodies. In its first operational position, at an extrusion station I, the multi-head station 2 produces necessary for blow forming performs in form of hose sections 6 (see FIG. 2). The preforms are produced in a blow mold 8 which consists of two mold halves 7a and 7b. In the first operational position, the mold halves 7a and 7b are spaced from each other, and the blow mold 8 is located below the multi-head station 2. The blow mold 8 has a plurality of cavities corresponding to the number of head strands 1 in the multi-head station 2. The withdrawal of the hose sections 6 from the multi-head station 2 and placing them into the blow mold 8 is effected with a feeder 10 displaceable up and down as shown by a double arrow 9 in FIG. 2. The feeder 10 can be provided, when the hose sections 6 should not be teared off, with cutting, welding and/or preblow means. The mold halves 7a, 7b of the blow mold 8 are arranged in a locking unit 12 closing of which is effected with a closing cylinder 11.

After the locking unit 12, together with the mold halves 7a, 7b with the hose sections enclosed in the respective cavities of the mold halves 7a, 7b, has been closed, the blow mold 8, together with the locking unit 12, is displaced from its position beneath the multi-head station 2, into a second operational position, at a blow or calibration station II which is parallel to the extrusion station I and is spaced therefrom by a distance 13. The displacement is effected at a right angle to a connection line connecting the cavities of the blow mold 8. At the blow or calibration station II, a plurality of blow mandrels 16, supported in a retaining plate 14 of a calibration device 15, are quickly inserted into the hose sections 6 which are enclosed between the mold halves 7a, 7b.

Upon expiration of predetermined blow time, the blow mold 8 is opened, and the blow mandrels 16, together with finished blown hollow bodies, are lifted to an intermediate position (not shown) at which a withdrawal device 17, e.g. a withdrawal gripper, picks up the finished blown hollow bodies or articles. Thereafter, the blow mandrels 16 are lifted to an upper position (not shown), and the hollow bodies, which remain in the intermediate position, are transported by the withdrawal device 17 to another station where they are stamped or coined and cooled. Meantimes, new preforms, hose sections 6, are placed into the blow mold 8, and the process is repeated.

For displacement between the extrusion station I and the blow or calibration station II, which is arranged parallel to the extrusion station I, the blow mold 8 and the locking unit 12 are mounted on a support 18 of a frame 19 of the blow molding machine 3. A cylinder 20 provides for the displacement of the support 18, together with the blow mold 8 and the locking unit 12, between the extrusion station I and the blow or calibration station II.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A method of manufacturing hollow bodies in a multi-cavity blow molding machine having an extrusion station, a calibration station spaced from the extrusion station and located parallel thereto, and a blow mold, the method comprising the steps of:

inserting, into spaced molding halves of the blow mold, plastic hose-shaped blanks at the extrusion station and closing the blow mold;

displacing the closed blow mold from the extrusion station to the calibration station;

inserting, at the calibration station, blow mandrels into respective cavities of the closed blow mold;

lifting, after expiration of a predetermined blow time, the blow mandrels, together with the blown hollow bodies, to an intermediate position and removing the blown hollow bodies from the blow mandrels;

lifting the blow mandrels to an initial position thereof; and displacing the blow mold from the calibration station to the extrusion station;

wherein both the steps of displacing the blow mold from the extrusion station to the calibration station and the step of displacing of the blow mold from the calibration station to the extrusion station include displacing the blow mold at right angle to a connection line of arranged side-by-side cavities of the blow mold.

2. A multi-cavity blow molding machine for manufacturing hollow bodies of plastic material, comprising:

an extrusion station;

a calibration station spaced from and arranged parallel to the extrusion station;

a blow mold displaceable between the extrusion and the calibration stations and having a plurality of cavities arranged side-by-side and a connection line of which extends at a right angle to a displacement path of the blow mold; and means for displacing the blow mold between the extrusion and calibration station.

3. A blow molding machine as set forth in claim 2, further comprising a locking unit for the blow mold, and support means for supporting the locking unit, together with the blow mold, and wherein the displacing means comprises drive means for displacing the support means.

4. A blow molding machine as set forth in claim 2, further comprising feeder means provides at the extrusion station for inserting hose blanks formed at the extrusion station into the cavities of the blow mold.

5. A blow molding machine as set forth in claim 4, wherein the feeder means includes at least one of cutting means, welding means, and preblow means.

* * * * *